United States Patent
Labataille et al.

(10) Patent No.: US 9,395,018 B2
(45) Date of Patent: Jul. 19, 2016

(54) CONTROL ALGORITHM FOR FREEING AN EGR VALVE FROM CONTAMINATION ADHESION

(75) Inventors: Joseph Labataille, Royal Oak, MI (US); Robert D. Keefover, Lake Orion, MI (US); David Kaitschuck, Commerce Township, MI (US); Murray Busato, Clinton Township, MI (US)

(73) Assignee: BorgWarner Inc., Auburns Hills, MI (US)

( * ) Notice: Subject to any disclaimer, the term of this patent is extended or adjusted under 35 U.S.C. 154(b) by 2271 days.

(21) Appl. No.: 12/373,845

(22) PCT Filed: Jul. 18, 2007

(86) PCT No.: PCT/US2007/016273
§ 371 (c)(1),
(2), (4) Date: Jan. 14, 2009

(87) PCT Pub. No.: WO2008/013714
PCT Pub. Date: Jan. 31, 2008

(65) Prior Publication Data
US 2009/0294711 A1 Dec. 3, 2009

Related U.S. Application Data

(60) Provisional application No. 60/833,172, filed on Jul. 25, 2006.

(51) Int. Cl.
*H01H 47/00* (2006.01)
*F16K 37/00* (2006.01)
*H01F 7/18* (2006.01)
*H01H 3/00* (2006.01)
*H01H 1/00* (2006.01)

(52) U.S. Cl.
CPC ............ *F16K 37/0083* (2013.01); *H01F 7/1844* (2013.01); *H01H 1/0015* (2013.01); *H01H 3/001* (2013.01); *H01H 47/002* (2013.01); *H01H 2047/003* (2013.01)

(58) Field of Classification Search
USPC .................. 631/153; 361/160, 170, 179, 189
See application file for complete search history.

(56) References Cited

U.S. PATENT DOCUMENTS

| 4,213,183 A | 7/1980 | Barron et al. |
| 7,086,636 B2 | 8/2006 | Telep et al. |
| 7,104,523 B2 | 9/2006 | Busato et al. |

(Continued)

FOREIGN PATENT DOCUMENTS

| EP | 1 271 419 | * | 1/2003 |
| EP | 1 271 419 A |   | 1/2003 |

(Continued)

*Primary Examiner* — Danny Nguyen
(74) *Attorney, Agent, or Firm* — Warn Partners, P.C.

(57) ABSTRACT

A method of controlling a device having restricted movement. A controller is provided for controlling the operation of the device using a control algorithm. A normal operation control method is programmed onto the controller and is selectively activated by the controller to generate a normal control signal. A forcing control method is also programmed into the controller and selectively activates a forcing control signal. The normal operation control signal provides regular operation of the device, while the forcing control signal causes the device to operate in a manner that will correct the operation of the device when a restricted motion of the device is detected.

29 Claims, 4 Drawing Sheets

(56) References Cited

U.S. PATENT DOCUMENTS 7,487,789 B2    2/2009   Telep et al.
2007/0087896 A1*   4/2007   Matsuzaki et al. ............ 477/107

FOREIGN PATENT DOCUMENTS

| | | |
|---|---|---|
| JP | 60 164081 A | 8/1985 |
| WO | WO 99/19778 A | 4/1999 |

* cited by examiner

CONTROL ALGORITHM FOR FREEING AN EGR VALVE FROM CONTAMINATION ADHESION

CROSS-REFERENCE TO RELATED APPLICATIONS

This application claims the benefit of U.S. Provisional Application No. 60/833,172, filed Jul. 25, 2006.

FIELD OF THE INVENTION

The present invention relates to a valve control algorithm for freeing a stuck valve.

BACKGROUND OF THE INVENTION

Federal and State legislation require control of vehicle exhaust emissions. Oxides of Nitrogen (NOx) are one of the exhaust gas emissions that must be controlled.

Formation of NOx will occur at higher combustion temperatures. In order to reduce the occurrence of the formation of NOx gasses, exhaust gas recirculation systems have been developed which effectively reduce combustion temperatures and control emissions. Exhaust gas recirculation systems work by re-circulating a portion of the exhaust gas from an engine back to the intake manifold where it can combined with incoming air. When the mixture is compressed and ignited in the cylinder the result is a lower combustion temperature and the reduction of NOx. In order to make the recirculation of exhaust gas possible, exhaust gas recirculation systems use exhaust gas recirculation (EGR) valves to open and close the conduits that recirculate the exhaust gas back to the intake manifold of the engine.

The composition of exhaust gas includes substances that can effect the operation of the EGR valve. These substances typically adhere to the EGR valve components and restrict movement of the poppet valve, valve stem and other associated valve components. Also, it is particularly important to avoid exposing the actuator component of an EGR valve to the exhaust gas. In general contamination of an EGR valve impedes the movement of the valve and may require higher actuating force to achieve a desired valve position and exhaust gas flow. The operation of the EGR valve can be controlled in order to provide valve freeing force movements when a stuck valve situation is detected.

SUMMARY OF THE INVENTION

The present invention is directed to a method of controlling a device having restricted movement. A controller is provided for controlling the operation of the device using a control algorithm. A normal operation control method is programmed onto the controller and is selectively activated by the controller to generate a normal control signal. A forcing control method is also programmed into the controller and selectively activates a forcing control signal. The normal operation control signal provides regular operation of the device, while the forcing control signal causes the device to operate in a manner that will correct the operation of the device when a restricted motion of the device is detected. The method is carried out by the controller activating a first initial learn sequence where the operation of the device is checked to see if a restricted motion condition exists. If a restricted motion condition is detected, then the forcing control signal is activated by the controller causing the device to operate in a forcing mode. After the forcing mode has occurred for a given period of time, then the controller will cause the device to perform a device function test where the device will move a predetermined amount of its range of motion in order to make an evaluation of whether or not a restricted motion condition exists. After the device function test has occurred, the controller will activate a second initial learn sequence wherein the device is checked to see if it is functioning properly. If the device is functioning properly, then the controller will activate the normal control signal and the device will operate along its normal course.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

The description of the invention is merely exemplary in nature and, thus, variations that do not depart from the gist of the invention are intended to be within the scope of the invention. Such variations are not to be regarded as a departure from the spirit and scope of the invention.

DETAILED DESCRIPTION OF THE PREFERRED EMBODIMENTS

The description of the invention is merely exemplary in nature and, thus, variations that do not depart from the gist of the invention are intended to be within the scope of the invention. Such variations are not to be regarded as a departure from the spirit and scope of the invention.

Figure 1:
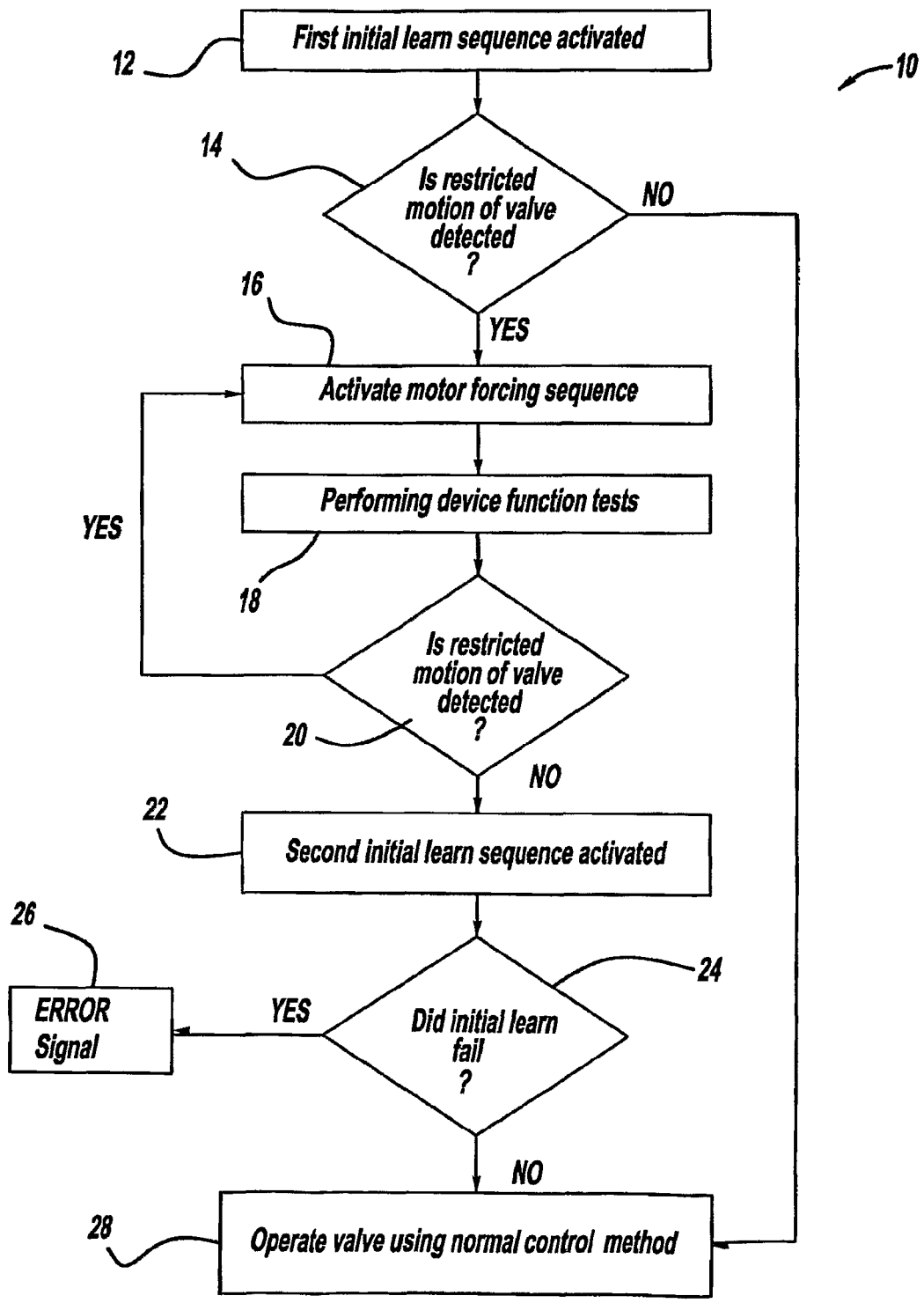
FIG. 1 depicts a flow chart outlining the steps of the control algorithm for freeing a device from contamination adhesion.

FIG. 1 depicts a flow chart outlining the steps of a control algorithm 10 for freeing a device, such as an electromagnetic device, from contamination adhesion. The control algorithm 10 has a first step 12 where an initial learn sequence is executed. The initial learn sequence can occur at engine start up or at any suitable time when the sequence can occur so that it will not effect the operation of the device. As shown in FIG. 2, the electromagnetic device can be an exhaust gas recirculation valve (EGR) valve, however, it is possible to use this method in other types of applications where there is sticking of a device as a result of environmental factors.

When the initial learn sequence of the first step 12 begins, the electromagnetic device will move through its entire range of motion or a portion of its range of motion and at a second step 14, a determination is made as to whether or not the electromagnetic device is experiencing restricted motion.

If it is determined that a restricted motion condition does exist, then at a third step 16, a forcing sequence signal is transmitted to the device. The forcing sequence sends motor outputs of varying intensity that act on the electromagnetic device to cause rapid movement in order to free the valve from a restricted motion condition. The restricted motion can be caused by several different factors which include environmental conditions such as contamination or coking of a valve member that causes a sticking condition. The forcing function is a series of pulses that are directed to a bi-directional or uni-directional actuator. The pulses can vary in duration as well as intensity and frequency. For a given application, it is possible for some frequencies to be more ideal than others.

At a fourth step 18 of the control algorithm 10, a device function test signal will be transmitted to the electromagnetic device where it is determined whether or not the restricted motion condition still exists. At a step 20, a determination is made of whether or not a restricted motion condition still exists. If a restricted motion condition still exists, then the third step 16 and fourth step 18 will be repeated and another device function test will be performed.

If at step 20 it is determined that no restricted motion condition exists then at a step 22 a second initial learn sequence is activated. If any errors are detected then at a step 26 an error signal will be transmitted/logged and the device will not function. If there is no failure of the device, then at a step 26 the normal control method will be used and the device will operate normally. If at step 14 it is determined that there is no restricted motion then steps 16-26 will be skipped completely and the device will operate normally using a normal control method at step 28.

Figure 2A:
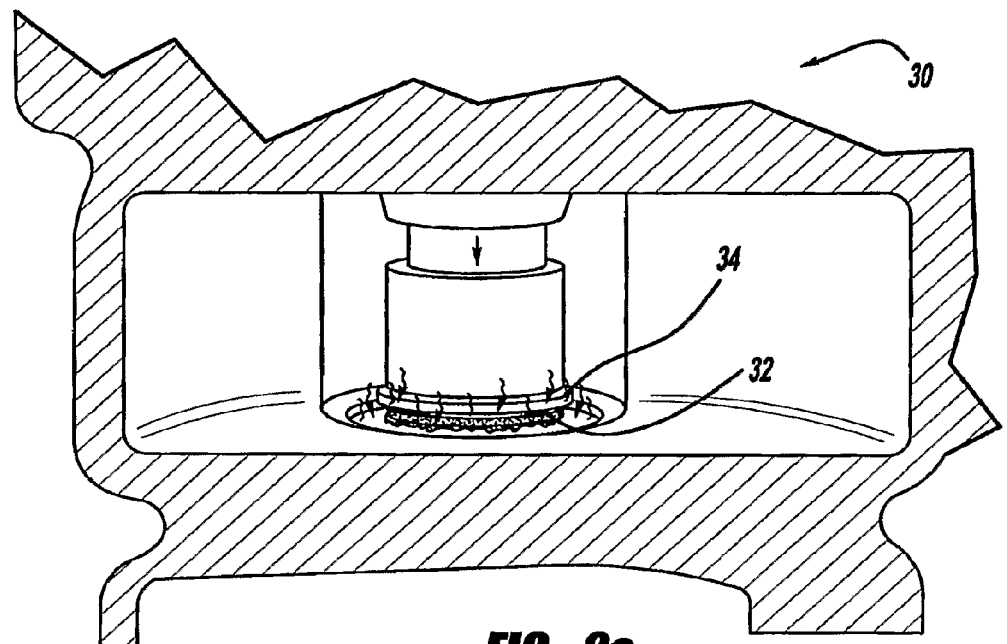
FIGS. 2a and 2b depict a partially broken away perspective view of the exhaust gas recirculation valve moving between the stuck and free positions.
Figure 2B:
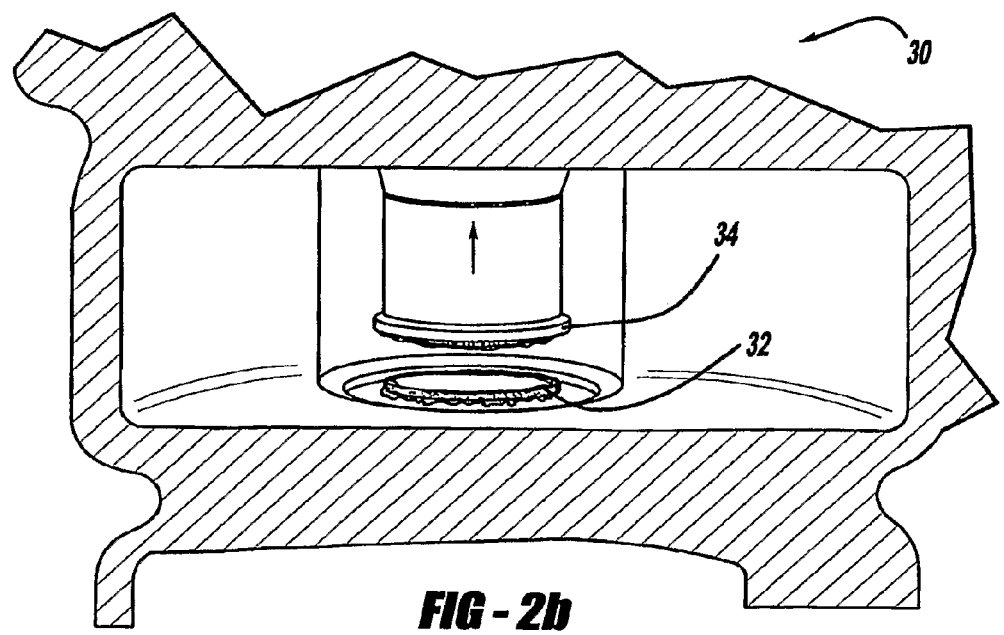

Referring now to FIGS. 2a and 2b perspective views of a device 30 having a stuck valve that is freed using the control algorithm 10 are shown. The valve 30 in this particular application is an exhaust gas recirculation valve that is experiencing restricted motion as a result of contamination. The device 30 has a valve seat 32 which in this case has soot or particulate coked around its surface. A valve member 34 as shown in FIG. 2a is stuck against the valve seat 32. In FIG. 2a the device 30 has experienced restricted motion. Therefore, a forcing control signal is activated and the valve member 34 rapidly rotates and pulls upward away from the valve seat 32. The rapid application of intermittent load of the valve member 34 in relation to the seat 32 breaks the valve member 34 free from the coking material on the valve member 34 and the valve seat 32. In FIG. 2b the valve member 34 has broken away from the valve seat 32 and some of the coking material has been removed from the valve member and valve seat as a result of the forcing control signal.

Figure 3:
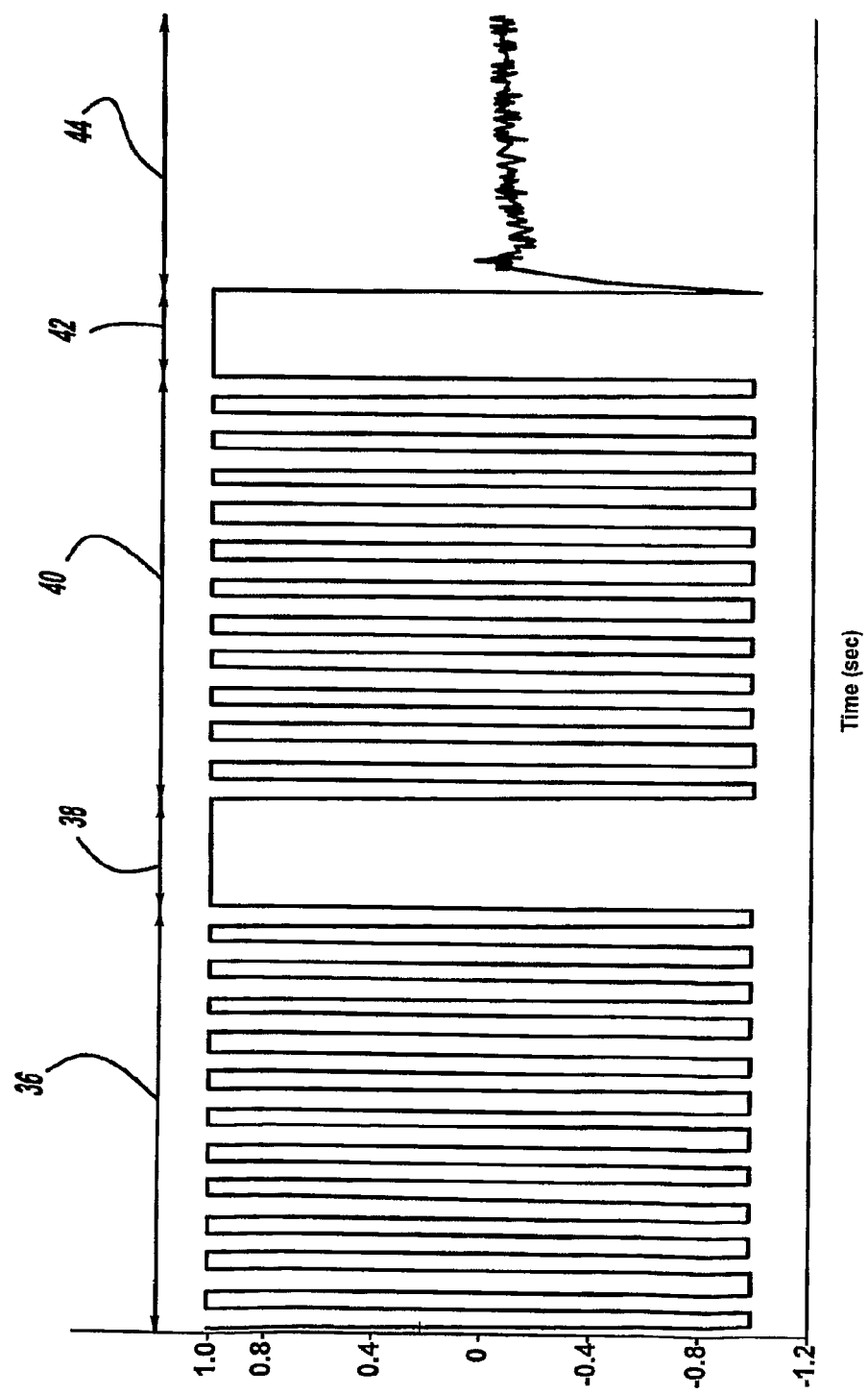
FIG. 3 depicts a graph of the forcing control signal.

FIG. 3 shows a graph of the forcing control signal that performs on the device 30 in FIGS. 2a and 2b, and described at step 16 in FIG. 1. The forcing control signal has a first phase 36 that varies in frequency and intensity. The negative intensity represents the device 30 moving the valve member 34 in one direction, while the positive intensity represents the device 30 moving the valve member 34 in an opposite direction. The intensity of the signal can vary between 0% and 100% maximum achievable motor force as well as the frequency or number of pulses can be any number. Also it is possible for the intensity levels to go in one direction for a period of time and then in a second direction for a period of time. After a first forcing phase 36, the forcing function will perform a device function test 38 and a determination is made whether or not restricted motion of the valve is still occurring. This is done by moving the valve member 34 a distance from the valve seat 32. If restricted motion is still detected (step 20 on FIG. 1) then a second forcing phase cycle 40 will be performed on the valve 30 (step 16 on FIG. 1). After the second forcing phase cycle 40, a second device function test 42 will be performed. The number of forcing phases and device function tests performed can vary and are not limited to two. The process will keep repeating until it is determined that the valve is no longer sticking or a maximum number of cycles has occurred. Once it is determined that the restricted motion condition no longer exists, a normal control method 44 will be applied.

The amount of coking material 33 removed from the valve member 35 and valve seat 32 can be enhanced by the composition of the forcing control signal. For example, certain frequencies or intensity levels of the motor output have been determined to remove contamination better than other frequencies or intensities. In the case of an EGR valve a frequency range of about 10-500 Hertz have been found to be effective.

Figure 4:
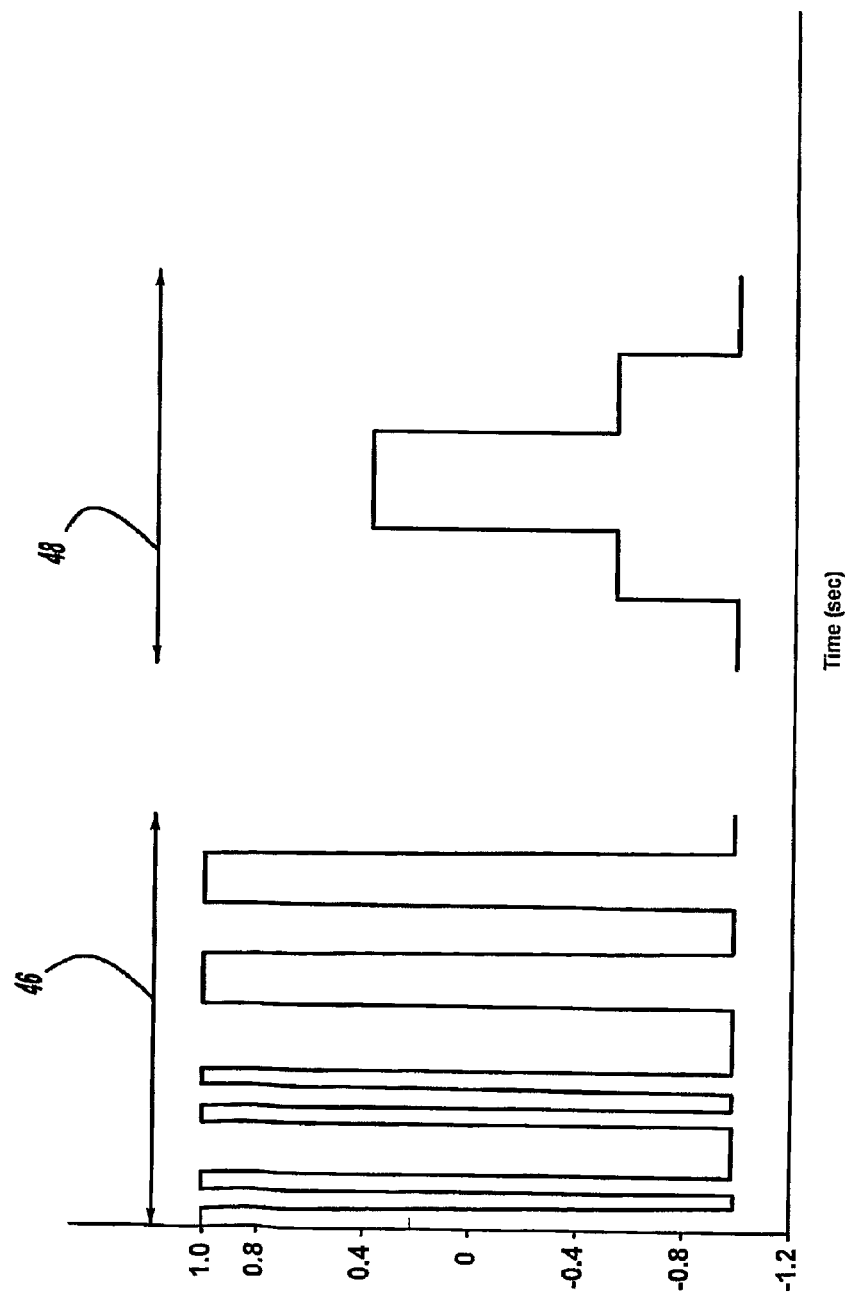
FIG. 4 depicts a graph of two variations of the forcing control signal having variations on duration and amplitude.

Referring to FIG. 4, two variations of the forcing motor output are shown. A forcing control signal 46 shown in FIG. 4 has an output signal that varies in duration. The forcing control signal 46 can be a sweeping frequency having a duration that can be predetermined or random. The forcing control signal 46 of this type can be, for example, a pulse width modulated. A forcing control signal 48 is a signal that has varying amplitude over a period of time. The forcing control signal of this type can be, for example, an amplitude modulation signal.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling an electromechanical device comprising the steps of:
   providing an electromechanical device for controlling motion;
   providing a controller for controlling said electromechanical device and detecting when said electromechanical device is not controlling motion, wherein said controller includes a forcing control signal having a plurality of pulses having at least two intensity levels;
   detecting when the electromechanical device is not controlling motion; and
   applying said forcing control signal to said electromechanical device for a period of time, wherein said forcing signal applies said plurality of pulses that are applied for a period of time.

2. The method of claim 1 wherein said forcing control signal has a level of intensity that is controlled by a pulse-width modulation control.

3. The method of claim 1 wherein the forcing control signal has a level of intensity that is controlled by an amplitude modulation control.

4. The method of claim 1 wherein said at least two intensity levels alternate at a predetermined rate of time.

5. The method of claim 1 wherein said at least two intensity levels alternate at a random rate of time.

6. The method of claim 1 wherein said intensity levels change at a predetermined rate of time.

7. The method of claim 1 wherein said intensity levels are set to a constant frequency.

8. The method of claim 1 wherein said intensity levels sweep upward or downward in frequency.

9. The method of claim 1 wherein said intensity levels change at a random rate of time.

10. The method of claim 1 further comprising the step of monitoring said electromechanical device and determining if said forcing control signal will continue to be applied.

11. The method of 10 wherein said step of monitoring further comprises monitoring a level of restriction as determined by the rate of movement of said electromechanical device.

12. The method of claim 10 wherein said step of monitoring further comprises determining a level of restriction of said electromechanical device by determining the electrical current being drawn by said electromechanical device.

13. The method of claim 10 wherein said step of monitoring further comprises determining the level of restriction of said electromechanical device by using one or more position sensors operable to determine the position of said electromechanical device.

14. The method of claim 1 further comprising the steps of:
providing an initial learn sequence programmed on said controller;
activating said initial learn sequence, wherein the operation of said electromechanical device is checked to determine if a restricted motion condition exists; and
applying a forcing control signal in response to said restricted motion condition being detected.

15. The method of claim 14 further comprising the step of monitoring said electromechanical device and determining if said forcing control signal will continue to be applied, wherein said step of monitoring further comprises monitoring a level of restriction as determined by one or more of the group comprising, the rate of movement of said electromechanical device, the current being drawn by said electromechanical device and the level of restriction of said electromechanical device by using one or more position sensors operable to determine the position of said electromechanical device.

16. The method of claim 14 further comprising the steps of:
providing a function test signal;
activating said function test signal causing said electromechanical device to determine whether a restricted motion condition has been resolved;
activating said second initial learn signal, wherein the operation of the electromechanical device is checked to determine if any errors are present;
providing a normal function signal; and
activating said normal function signal, wherein said electromechanical device will operate under regular operating conditions.

17. The method of claim 14 wherein said at least two intensity levels alternate at a predetermined rate of time.

18. The method of claim 14 wherein said at least two intensity levels are set to a constant frequency.

19. The method of claim 14 wherein said at least two intensity levels sweep upward or downward in frequency.

20. The method claim 14 wherein said at least two intensity levels alternate at a random rate of time.

21. The method of claim 14 wherein said at least two or more intensity levels that change at a predetermined rate of time.

22. The method of claim 14 wherein said at least two intensity levels that change at a random rate of time.

23. The method of claim 14 further comprising the step of monitoring said device and determining if said forcing control signal will continue to be applied.

24. The method of claim 23 wherein said step of monitoring further comprises monitoring a level of restriction as determined by the rate of movement of said device.

25. The method of claim 23 wherein said step of monitoring further comprises determining a level of restriction of said electromagnetic device by determining the current being drawn by said device.

26. The method of claim 23 wherein said step of monitoring further comprises determining the level of restriction of said device by using one or more position sensors operable to determine the position of said device.

27. The method of claim 14 further comprising providing a function test signal;
activating said device function test signal causing said device to determine whether a restricted motion condition has been resolved.

28. The method of claim 27 providing a second initial learn signal;
activating said second initial learn signal, wherein the operation of the device is checked to determined if any errors are present.

29. A method of controlling an electromechanical device comprising the steps of:
providing an electromechanical device for controlling motion;
providing a controller configured to control the operation of said electromechanical device and detecting when said electromechanical device is not controlling motion;
providing a normal operation control signal programmed into said controller, said normal operation control signal is selectively operated by said controllers;
providing a forcing control signal that is programmed into said controller, said forcing control signal is selectively activated by said controller;
providing a first initial learn sequence programmed into said controller, said first initial learn sequence is selectively activated by said controller;
providing a second initial learn sequence programmed into said controller, said second initial learn sequence is selectively activated by said controller;
providing a device function test signal programmed into said controller;
activating said first initial learn sequence wherein the operation of said electromechanical device is checked to see if a restricted motion condition exists, wherein said electromechanical device is not controlling motion;
activating a forcing control signal in response to said restricted motion condition being detected, wherein said device operated in a forcing mode;
activating said device function test signal wherein said electromechanical device moves a predetermined amount of a range of motion of said electromagnetic device;
activating said initial learn sequence wherein the operation of said electromechanical device is evaluated to determine if said electromechanical device is functioning properly; and
activating said normal control signal wherein said electromechanical device is operated in a normal operation mode.

* * * * *